United States Patent
Ghosh et al.

(10) Patent No.: US 7,167,726 B2
(45) Date of Patent: Jan. 23, 2007

(54) MULTI-MODE ANTENNA SYSTEM FOR A COMPUTING DEVICE AND METHOD OF OPERATION

(75) Inventors: Prosenjit Ghosh, Portland, OR (US); Al Bettner, Los Gatos, CA (US); Alan E. Waltho, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 10/367,233

(22) Filed: Feb. 14, 2003

(65) Prior Publication Data

US 2004/0160370 A1 Aug. 19, 2004

(51) Int. Cl.
*H04B 1/38* (2006.01)
*H04M 1/00* (2006.01)

(52) U.S. Cl. ............. 455/557; 455/552.1; 455/556.1; 455/134; 455/556.2; 455/562.1; 455/575.5; 455/575.7; 342/162; 342/189; 342/25 F; 701/215; 463/31

(58) Field of Classification Search .............. 455/41.2, 455/557, 556.1, 556.2, 562.1, 277.1, 275, 455/134, 552.1; 342/417, 162, 189; 463/31
See application file for complete search history.

(56) References Cited

U.S. PATENT DOCUMENTS

| | | |
|---|---|---|
| 5,138,328 A | 8/1992 | Zibrik et al. |
| 5,644,320 A | 7/1997 | Rossi |
| 5,684,672 A | 11/1997 | Karidis et al. |
| 5,828,341 A | 10/1998 | Delamater |
| 5,867,131 A * | 2/1999 | Camp et al. ............... 343/797 |
| 6,008,774 A | 12/1999 | Wu |
| 6,115,762 A | 9/2000 | Bell et al. |
| 6,262,495 B1 | 7/2001 | Yablonovitch et al. |
| 6,297,779 B1 | 10/2001 | Tsai |
| 6,339,400 B1 | 1/2002 | Flint et al. |
| 6,359,591 B1 | 3/2002 | Mou |
| 6,370,376 B1 * | 4/2002 | Sheath .................. 455/556.1 |
| 6,411,261 B1 | 6/2002 | Lilly |
| 6,456,245 B1 * | 9/2002 | Crawford .................. 343/702 |
| 6,501,427 B1 | 12/2002 | Lilly et al. |
| D468,730 S | 1/2003 | Chahal et al. |
| 6,509,877 B1 * | 1/2003 | Masaki ..................... 343/702 |
| 6,512,494 B1 | 1/2003 | Diaz et al. |
| 6,538,606 B1 * | 3/2003 | Quinn et al. ............... 343/702 |
| 6,628,236 B1 | 9/2003 | Kim et al. ................. 343/702 |
| 6,686,886 B1 * | 2/2004 | Flint et al. ................. 343/702 |
| 6,812,897 B1 * | 11/2004 | Jarmuszewski et al. ..... 343/702 |
| 5,943,018 A1* | 12/2004 | Kim et al. ................. 343/702 |
| 6,853,336 B1 * | 2/2005 | Asano et al. ............... 343/702 |
| 6,191,741 B1 * | 4/2005 | Sato ......................... 343/702 |
| 6,885,880 B1 * | 4/2005 | Ali ........................... 455/575.7 |
| 6,947,001 B1 * | 9/2005 | Finn et al. ................. 343/702 |
| 6,950,069 B1 * | 9/2005 | Gaucher et al. ........... 343/702 |

(Continued)

FOREIGN PATENT DOCUMENTS

EP 0 571 124 A1 11/1993

(Continued)

*Primary Examiner*—Marceau Milord
(74) *Attorney, Agent, or Firm*—Blakely, Sokoloff, Taylor & Zafman LLP

(57) ABSTRACT

An antenna system for a computing device operable in multiple communication modes.

19 Claims, 10 Drawing Sheets

U.S. PATENT DOCUMENTS

| | | |
|---|---|---|
| 2001/0052878 A1 | 12/2001 | Kim et al. |
| 2002/0021250 A1 | 2/2002 | Asano et al. |
| 2002/0024469 A1 | 2/2002 | Masaki |
| 2002/0101706 A1 | 8/2002 | Shin |
| 2002/0111194 A1* | 8/2002 | Behbahani et al. ......... 455/566 |
| 2002/0151328 A1 | 10/2002 | Shin et al. |
| 2002/0167456 A1 | 11/2002 | McKinzie, III |
| 2002/0167457 A1 | 11/2002 | McKinzie, III et al. |
| 2002/0171588 A1 | 11/2002 | Fang |

FOREIGN PATENT DOCUMENTS

| | | |
|---|---|---|
| WO | WO 02/069447 A1 | 9/2002 |
| WO | WO 03/007418 A2 | 1/2003 |

* cited by examiner

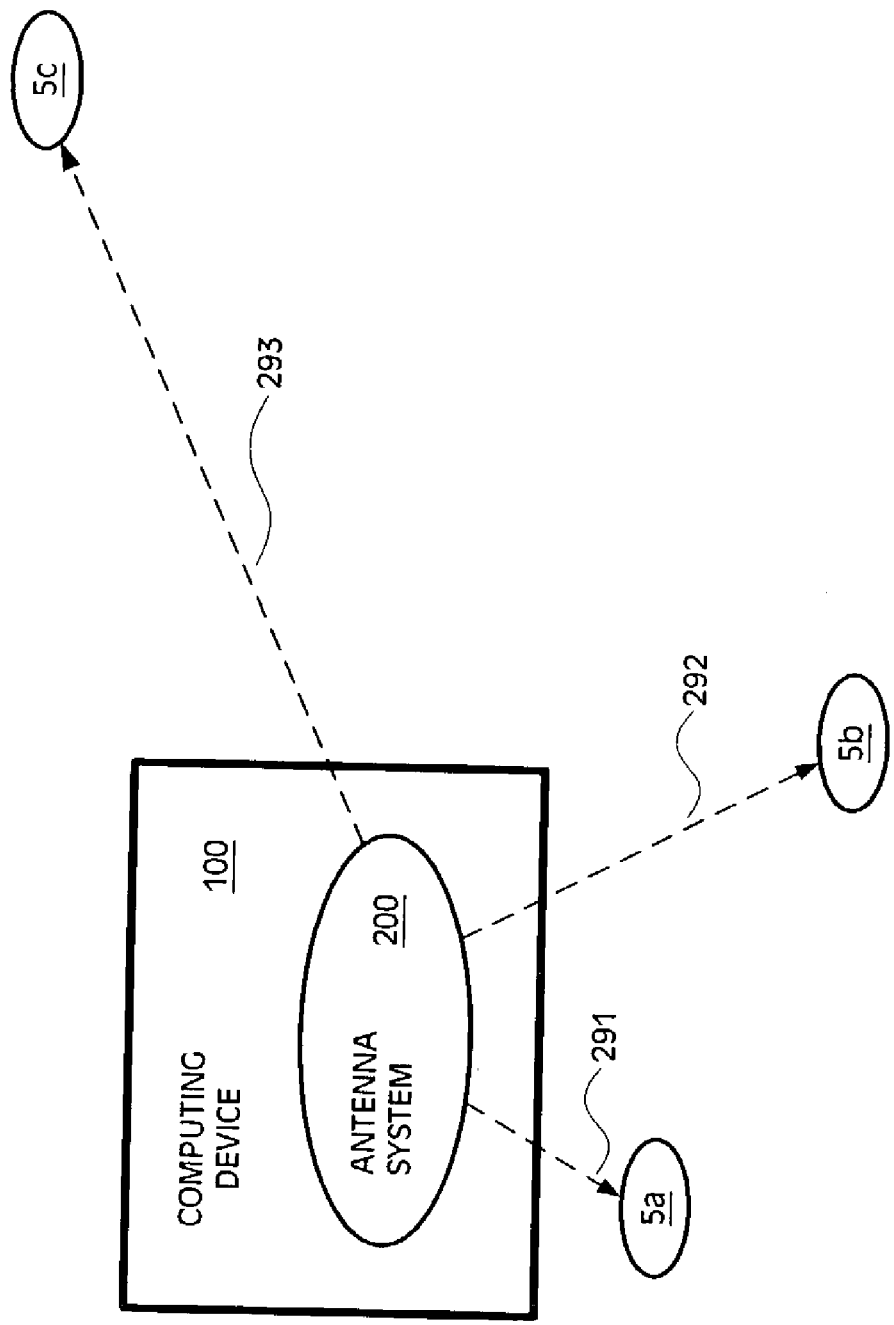

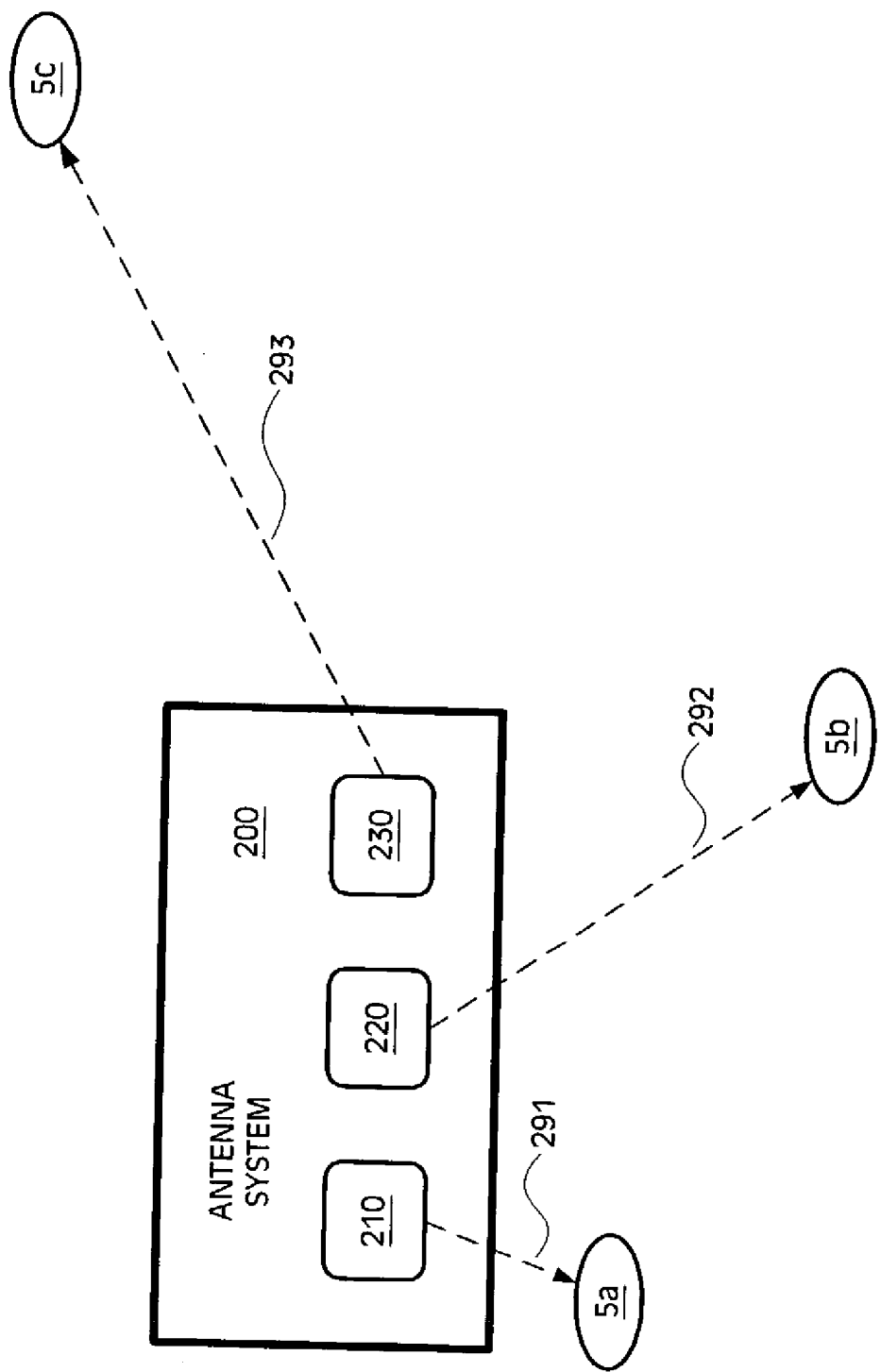

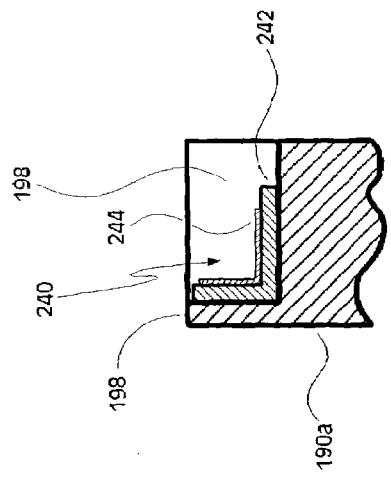
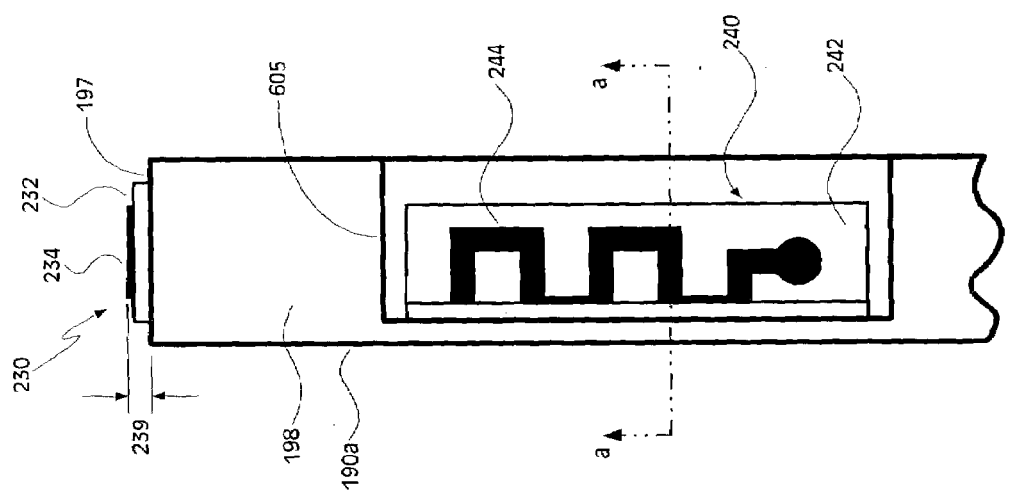

MULTI-MODE ANTENNA SYSTEM FOR A COMPUTING DEVICE AND METHOD OF OPERATION

FIELD OF THE INVENTION

The invention relates generally to wireless computer networking and, more particularly, to a multi-mode antenna system for a computing device.

BACKGROUND OF THE INVENTION

Portable computing devices—such as laptop computers, notebook computers, tablet style computers, hand-held computing devices (e.g., a personal digital assistant, or PDA), and the like—have become nearly ubiquitous as their desktop relatives. Users of portable computers often need access to a computer network yet, due to their mobility, a user of such a portable device may not have access to a wired network connection. Thus, the ability to access a network via a wireless network connection, or otherwise to conduct wireless communications, is highly desirable for these mobile computing devices.

Mobile computer users may need to conduct wireless networking activities in a variety of network environments at different times or even simultaneously. By way of example, a user may wish to communicate wirelessly over a relatively short range with a network or with individual devices (e.g., printers and other peripherals). A network—or, more generally, a wireless connection between two or more devices—that takes place over a relatively short range (e.g., up to 10 meters) is sometimes referred to as a Personal Area Network, or PAN. The user may also need to establish a wireless connection with a Local Area Network, or LAN. A typical wireless LAN connection may extend over a range of, for example, from 10 to 100 meters. Further, the user of this mobile computing device may want to establish a wireless connection with a network over a relatively long range (e.g., greater than 100 meters). A network extending over a vast region is often referred to as a Wide Area Network, or WAN.

One technology used for establishing wireless PAN connections is Bluetooth™. Bluetooth is a short range, low power radio technology that supports both voice and data applications, and this technology provides frequency-hopping spread spectrum (FHSS) radio connections over multiple channels in the 2.4 GHz radio band (more precisely, in the 2.4 to 2.4835 GHz band). Bluetooth wireless technology generally supports a range up to 10 meters, although longer distances are possible with more powerful radios.

A wireless LAN technology is defined in the IEEE (Institute of Electrical and Electronics Engineers) 802.11 family of specifications, including 802.11a and 802.11b. The IEEE 802.11b standard defines wireless services over a 2.4 GHz band that spans a frequency range of 2.4 to 2.4835 GHz, whereas IEEE 802.11a defines wireless services over a number of bands in the 5 GHz frequency range, including 5.15 to 5.25 GHz, 5.25 to 5.35 GHz, and 5.725 to 5.825 GHz.

A technology useful for wireless WAN communications is the General Packet Radio Service, or GPRS. GPRS provides wireless, packet-based services over a GSM™ (Global System for Mobile Communications) network. A GSM network can be implemented in any frequency band; however, there are several frequency bands that are currently (or will shortly be) in use, including GSM400 (450.4–457.6 MHz and 460.4–467.6 MHz or 478.8–486 MHz and 488.8–496 MHz), GSM850 (824–849 MHz and 869–894 MHz), GSM900 (880–915 MHz and 925–960 MHz), GSM1800 (1710–1785 MHz and 1805–1880 MHz), and GSM1900 (1850–1910 MHz and 1930–1990 MHz).

Despite the availability of the above-described technologies, as well as others, to conduct wireless network communications at various frequencies, in a number of environments (e.g., a PAN, LAN, or WAN), and over various distances, a typical portable computing device is equipped or configured to operate in only one wireless RF (radio frequency) communications mode. A number of parameters may characterize a particular RF communications mode, including frequency, range or distance, networking environment (e.g., PAN, LAN, or WAN), and the communications standard or technology (e.g., Bluetooth, IEEE 802.11a and 802.11b, GPRS, etc.). A wireless RF communication mode will be referred to herein as simply a "mode."

A single mode computing device generally has one antenna optimized for that communication mode. For example, a portable computer may have a single antenna that is designed for wireless Bluetooth services in the 2.4 GHz band and, further, that is optimized for use over a relatively short range. However, this antenna may function poorly in other modes (e.g., in IEEE 802.11a or in a GPRS mode).

A variety of peripheral cards (e.g., PC Cards, PCI cards, etc.) providing wireless networking capabilities are presently available, and it may be possible to adapt a portable computer for use in multiple modes (e.g., for both Bluetooth in the 2.4 GHz band and IEEE 802.11a in the 5 GHz band). However, adapting a portable computing device for wireless networking in multiple modes using add-on peripheral cards may be impeded by space constraints, as space is generally at a premium in portable computers. Further, the placement of multiple antennas—each for use with a different mode—on a portable computing device presents co-existence problems, as a lack of isolation between antennas may lead to interference and cross-talk.

BRIEF DESCRIPTION OF THE DRAWINGS

FIG. 1 is a schematic diagram illustrating an embodiment of a computing device having an antenna system providing multiple modes.

FIG. 2A is a schematic diagram illustrating one embodiment of the multi-mode antenna system shown in FIG. 1.

FIG. 6A is a side elevation view illustrating one embodiment of the computing device shown in FIG. 4.

FIG. 6B shows a cross-sectional view of the computing device of FIG. 4, as taken along line a—a of FIG. 6A.

DETAILED DESCRIPTION OF THE INVENTION

Figure 2B:
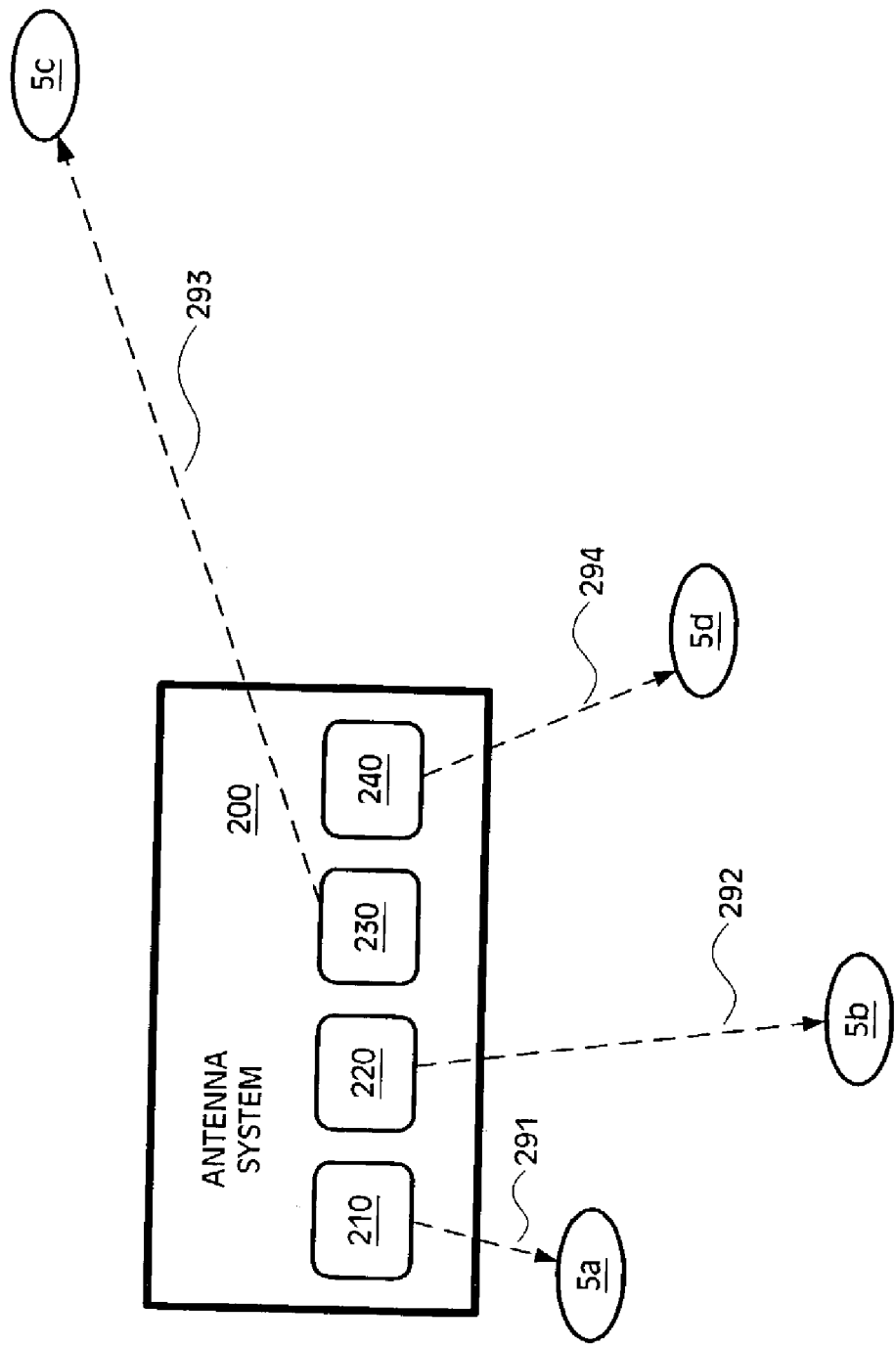
FIG. 2B is a schematic diagram illustrating another embodiment of the multi-mode antenna system shown in FIG. 1.

Embodiments of an antenna system providing wireless communications in a number of modes are described below. The disclosed embodiments of the multi-mode antenna system may find use in a wide array of computing devices, including laptop computers, notebook computers, tablet style computers, hand-held computing devices such as PDAs, as well as other mobile computing devices. However, it should be understood that, although described below in the context of portable computing devices, the disclosed embodiments are not so limited in application and, further, that the disclosed embodiments may find use in desktop computers and other less mobile computing devices. In addition to the embodiments of a multi-mode antenna system described below, also disclosed are the use of AMC-based antennas, embodiments of antenna mounting and isolation, interference and embodiments for providing isolation between antennas, and embodiments of a method for antenna selection and evaluation.

A. Multi-Mode Antenna System

Referring to FIG. 1, a computing device 100 includes a multi-mode antenna system 200. The computing device 100 may comprise any one of the above described computing devices, including a portable computer or a desktop computer. The multi-mode antenna system 200 provides computing device 100 with the capability to establish network connections in multiple modes, wherein a particular mode may be characterized by a number of parameters, including frequency, specification (e.g., Bluetooth, IEEE 802.11a and 802.11b, GPRS, etc.), networking environment (e.g., PAN, LAN, WAN, as well as others, such as a metropolitan area network, or MAN, and a system area network, or SAN), and range. The multi-mode antenna system 200 may comprise any suitable number and combination of antenna elements, and each of the antenna elements may comprise any suitable type of antenna. Generally, each of the antenna elements of antenna system 200 will provide for one mode of communication; however, in other embodiments, a single antenna may provide for two or more modes.

Antenna system 200 is capable of conducting network communications in multiple modes with a number of nodes. As used herein, the term "node" refers to any addressable device (or combination of devices), including routers, switches, computers, servers, and peripherals such as printers, as well as cellular base stations and satellite terminals. For example, in the embodiment of FIG. 1, antenna system 200 operates in a first mode 291 with a node 5*a*, in a second mode 292 with a node 5*b*, and in a third mode 293 with a node 5*c*.

Each of the modes 291, 292, 293 may have any desired characteristics. In one embodiment, a mode is characterized by a specified operating frequency. In another embodiment, a mode is compatible with a certain specification or technology. In a further embodiment, a mode is conducted within a particular networking environment. In yet another embodiment, a mode is characterized by a desired range. It should be understood that a mode may having any one or more of these characteristics (or others).

First mode 291 is, in one embodiment, characterized by an operating frequency in the 2.4 GHz band and, in a further embodiment, the first mode 291 is compatible with the Bluetooth™ specification. See, e.g., *Specification of the Bluetooth System: Core*, Vol. 1, Ver. 1.1, February 2001, promulgated by the Bluetooth Special Interest Group (SIG) and available at http://www.bluetooth.com. In a further embodiment, the first mode 291 comprises a wireless PAN connection and, in yet another embodiment, this PAN connection has a range up to approximately 10 meters, or other suitable range.

Second mode 292 is, in one embodiment, compatible with the IEEE 802.11 family of specifications. For example, the wireless connection with node 5*b* may be based upon the 802.11a specification or, alternatively, based upon the 802.11b specification. See, e.g., IEEE Std 802.11a-1999, *Supplement to IEEE Standard for Information Technology— Telecommunications and Information Exchange Between Systems—Local and Metropolitan Area Networks—Specific Requirements—Part*11: *Wireless LAN Medium Access Control (MAC) and Physical Layer (PHY) Specifications—High-Speed Physical Layer in the* 5 *GHz Band* (herein "IEEE 802.11a"), and IEEE Std 802.11b-1999, *Supplement to IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Higher-Speed Physical Layer Extension in the* 2.4 *GHz Band* (herein "IEEE 802.11b"). For IEEE 802.11a, the second mode 292 is characterized by an operating frequency in the 5 GHz band, and for IEEE 802.11b, the second mode 292 is characterized by an operating frequency in the 2.4 GHz band. In a further embodiment, the second mode 292 comprises a wireless LAN connection and, in yet another embodiment, this LAN connection can operate at ranges up to approximately 100 meters, or other suitable range.

Third mode 293 is, in one embodiment, characterized by an operating frequency selected from a frequency between 450 MHz and 1990 MHZ and, in another embodiment, the third mode 293 is compatible with the GPRS. See, e.g., Permanent Reference Document (PRD) IR.33, *GPRS Roaming Guidelines*, Ver. 3.1.0, April 2000, and PRD IR.40, *Guidelines for Ipv*4 *Addressing and AS Numbering for GPRS Network Infrastructure and Mobile Terminals*, Ver. 3.1.0, September 2001, both available from the GSM™ Association at http://www.gsmworld.com. In a further embodiment, the third mode 293 comprises a wireless WAN connection and, in yet another embodiment, this WAN connection can operate at ranges up to several kilometers (or other suitable range). Note that for relatively large distances (e.g., greater than 1000 meters), such a WAN connection may take place over both cellular telecommunication and/or satellite mediums and, due to the locations of cell sites, provide nearly continuous coverage.

For the embodiment shown in FIG. 1, it should be understood that, although only one node 5*a* is shown communicating with computing device 100 over the first mode 291, only one node 5*b* is shown communicating with computing device 100 over the second mode 292, and only one node 5*c* is shown communicating with computing device 100 over the third mode 293, computing device 100 may communicate with any suitable number of nodes within each of the modes 291, 292, 293. Also, computing device 100 may simultaneously communicate with multiple nodes across different modes. For example, the computing device 100 may have a Bluetooth compatible connection with one or more nodes while simultaneously communicating with one or more nodes over a GPRS compatible connection. In a further example, in addition to the simultaneous connections with nodes using Bluetooth and GPRS, the computing device may also simultaneously maintain a connection with one or more nodes using either an IEEE 802.11a or 802.11b compatible connection.

Embodiments of the multi-mode antenna system 200 are illustrated in FIGS. 2A and 2B, respectively. Referring to FIG. 2A, the antenna system 200 includes three antennas 210, 220, 230. The first antenna 210 is capable of communications over the first mode 291 (e.g., with node 5a), the second antenna 220 is capable of communications over the second mode 292 (e.g., with node 5b), and the third antenna 230 is capable of communications over the third mode 293 (e.g., with node 5c).

In one embodiment, first antenna 210 has an operating frequency in the 2.4 GHz band (i.e., between 2.4 and 2.48 GHz). In another embodiment, the first antenna 210 is compatible with the Bluetooth specification. In a further embodiment, the antenna 210 is capable of establishing PAN connections and, in yet another embodiment, the first antenna 210 has a range of approximately 10 meters, or other suitable range.

In one embodiment, second antenna 220 has an operating frequency in the 2.4 GHz band (i.e., between 2.4 and 2.48 GHz) and, in another embodiment, has an operating frequency in the 5 GHz band (i.e., between 5.15 and 5.825 GHz). In a further embodiment, the second antenna 220 is compatible with the IEEE 802.11 family of specifications (e.g., either IEEE 802.11a or 802.11b). In yet another embodiment, second antenna 220 is capable of establishing LAN connections and, in yet a further embodiment, the second antenna 220 has a range up to approximately 100 meters, or other suitable range.

In one embodiment, third antenna 230 has an operating frequency between 450 MHz and 1990 MHz and, in another embodiment, the third antenna 230 is compatible with the GPRS. In a further embodiment, third antenna 230 is capable of establishing WAN connections and, in yet a another embodiment, the third antenna 230 has a range up to several kilometers and greater (or other suitable range).

The embodiment of antenna system 200 illustrated in FIG. 2B is similar to that shown in FIG. 2A; however, the antenna system 200 of FIG. 2B includes a fourth mode of operation 294. Turning now to FIG. 2B, the antenna system 200 includes the three antennas 210, 220, 230, as described above, as well as a fourth antenna 240. The fourth antenna is capable of communications over the fourth mode 294 (e.g., with node 5d). In one embodiment, each of the second and fourth modes 292, 294 is compatible with one of IEEE 802.11a and 802.11b. Thus, one of the second and fourth antennas 220, 240 is compatible with IEEE 802.11a and the other of these antennas is compatible with IEEE 802.11b. In another embodiment, both of the second and fourth antennas 220, 240 are capable of establishing LAN connections and, in yet a further embodiment, each of the second and fourth antennas has a range up to approximately 100 meters, or other suitable range.

In a further embodiment of antenna system 200, two or more of the antennas may comprise a single integrated antenna. For example, for the embodiment of FIG. 2A, the first antenna 210 (e.g., providing a first mode 291 that is Bluetooth compatible and characterized by an operating frequency in the 2.4 GHz band) may be integrated with the second antenna 220 (e.g., providing a second mode 292 that is IEEE 802.11a compatible and characterized by an operating frequency in the 5 GHz band) as a single antenna. By way of further example, for the embodiment of FIG. 2B, the second antenna 220 (e.g., providing a second mode 292 compatible with IEEE 802.11b and characterized by an operating frequency in the 2.4 GHz band) may be integrated with the fourth antenna 240 (e.g., providing a fourth mode compatible with IEEE 802.11a and characterized by an operating frequency in the 5 GHz band) as a single antenna.

It should be understood that the embodiments of antenna system 200 shown and described with respect to FIGS. 2A and 2B are but a few examples of multi-mode antenna systems. Those of ordinary skill in the art will appreciate that such a multi-mode antenna system may include any suitable number, type, and combination of antennas. Further, as will also be appreciated by those of ordinary skill in the art, a mode may be characterized by characteristics other than those described above.

Figure 3:
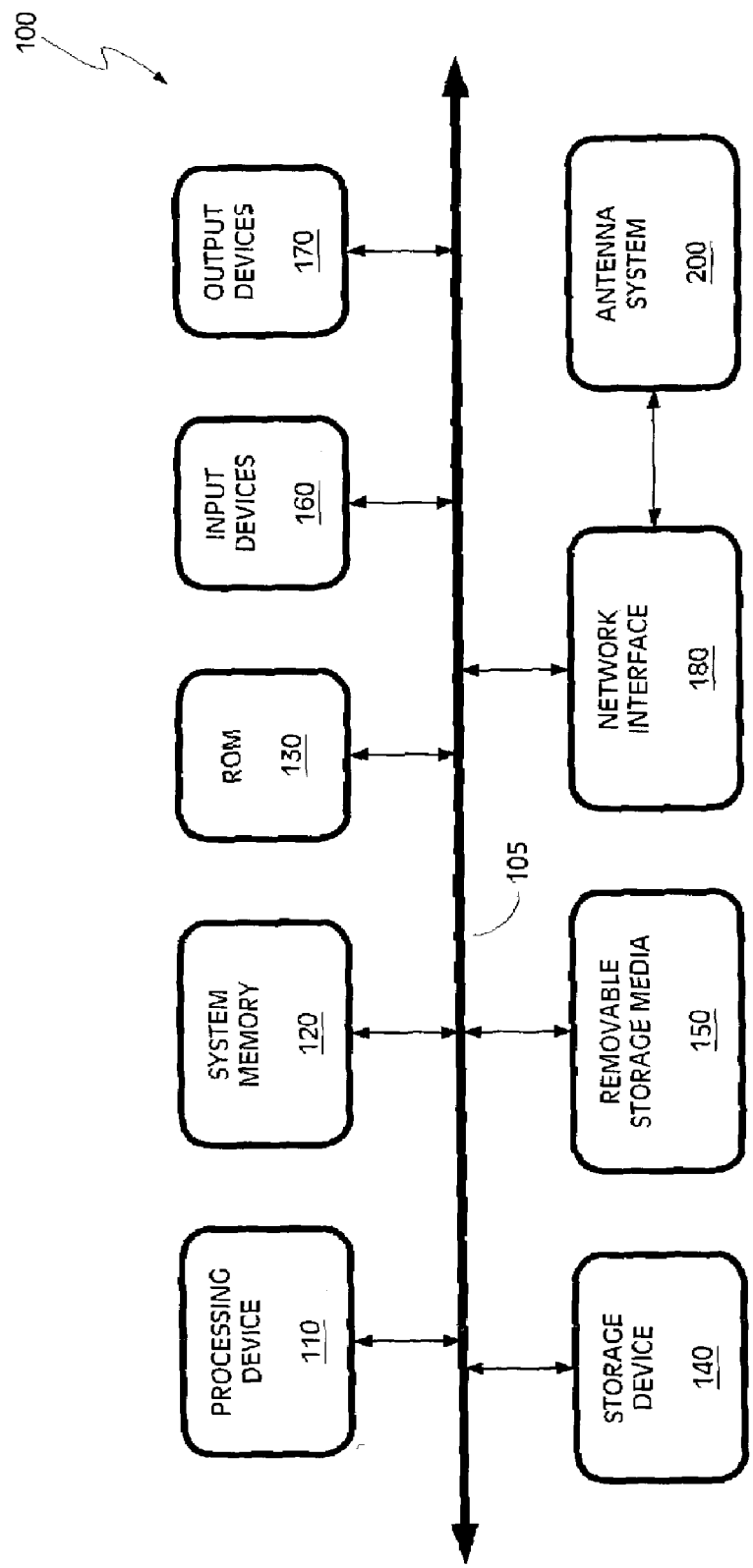
FIG. 3 is a schematic diagram illustrating an embodiment of the computing shown in FIG. 1.

Referring to FIG. 3, an embodiment of computing device 100 is illustrated. Computing device 100 includes a bus 105 having a processing device (or devices) 110 coupled therewith. The processing device 110 may comprise a microprocessor, an application specific integrated circuit (ASIC), or a field programmable gate array (FPGA), as well as any other suitable processing device. Computing device 100 also includes system memory 120 coupled with bus 105, the system memory 120 comprising, for example, any suitable type of random access memory (RAM). During operation, the system memory 120 may have an operating system resident thereon. The computing device 100 may further include a read-only memory (ROM) 130 coupled with the bus 105. During operation, the ROM 130 may store temporary instructions and variables for processing device 110, and ROM 30 may also have resident thereon a system BIOS (Basic Input/Output System).

Computing device 100 may include a storage device 140 coupled with the bus 105. The storage device 140 comprises any suitable non-volatile memory, such as, for example, a hard disk drive. Also, a device 150 for accessing removable storage media—e.g., a floppy disk drive or a CD ROM drive—may be coupled with bus 105. Further, computing device 100 may include one or more input devices 160 and one or more output devices 170 coupled with the bus 105. Common input devices 160 include keyboards, pointing devices such as a mouse, and scanners or other data entry devices, whereas common output devices 170 include video monitors and displays, printing devices, and audio output devices (e.g., a sound card and speakers). Note that peripheral devices (e.g., printers, etc.) may be coupled with the computing device 100 via a wireless network connection (e.g., a Bluetooth compatible connection) established using antenna system 200.

Computing device 100 further comprises a network interface 180 coupled with bus 105. The network interface 180 comprises any suitable hardware, software, or combination of hardware and software capable of maintaining a network connection with one or more nodes over any one (or more) of the first, second, and third modes 291, 292, 293 (and/or fourth mode 294). Network interface 180 is coupled with the multi-mode antenna system 200, as shown in FIG. 3.

It should be understood that the computing device 100 illustrated in FIG. 3 is intended to represent an exemplary embodiment of such a computer system and, further, that this computer system may include many additional components, which have been omitted for clarity and ease of understanding. By way of example, the computing device 100 may include a DMA (direct memory access) controller, a chip set associated with the processing device 110, additional memory (e.g., a cache memory), as well as additional signal lines and buses. Also, it should be understood that the computing device 100 may not include all of the components shown in FIG. 3.

Figure 4:
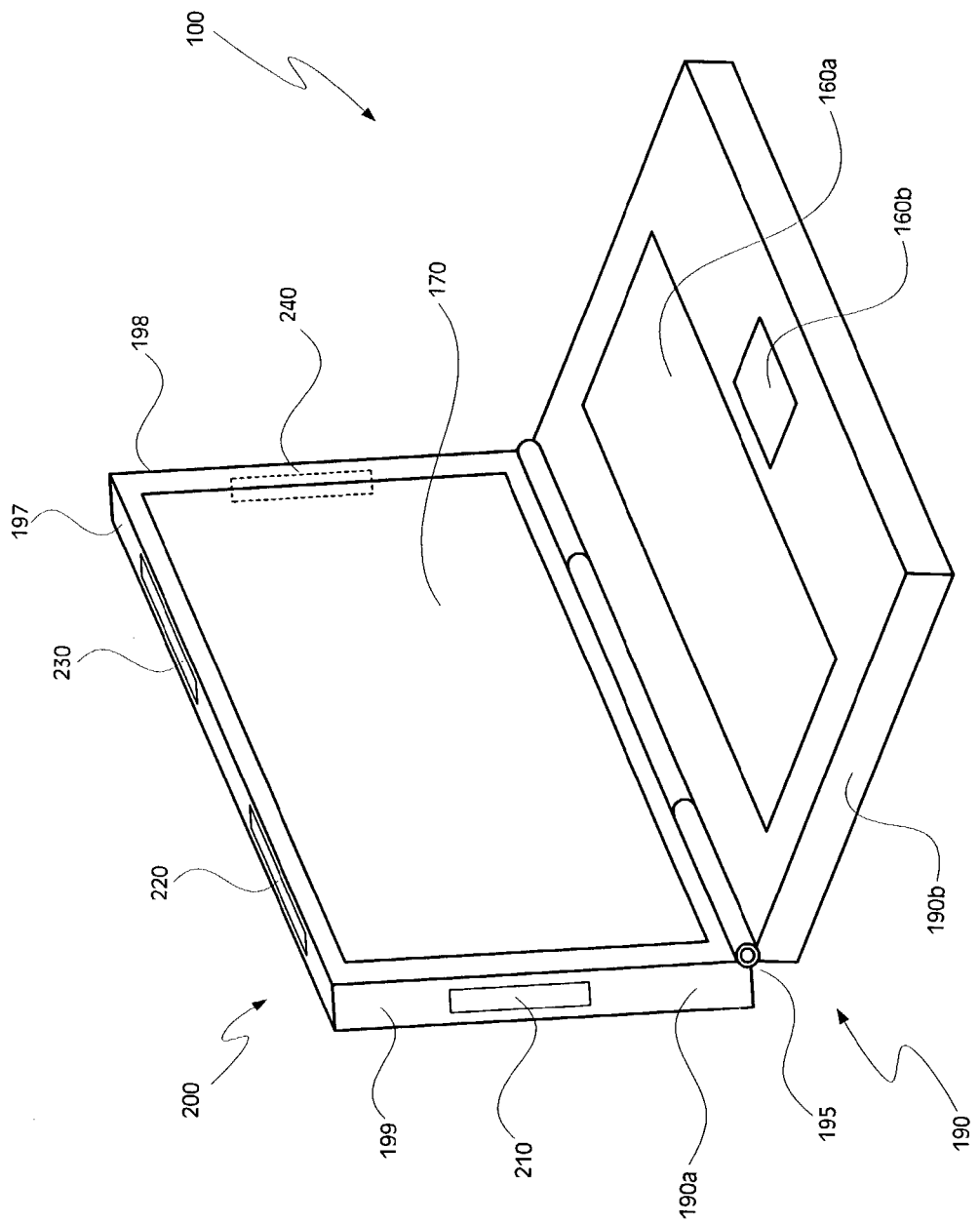
FIG. 4 is a perspective view of another embodiment of the computing device shown in FIG. 1.

Illustrated in FIG. 4 is a further embodiment of the computing device 100. In the embodiment of FIG. 4, the computing device 100 includes a housing 190 comprised of a first housing 190a and a second housing 190b. The housing elements 190a, 190b are movably coupled together by a connector 195. For example, as shown in FIG. 4, the connector 195 may comprise a hinge allowing relative rotation between the first housing 190a and the second housing 190b. The housing 190 may be constructed of any suitable material (or materials), including metals, plastics, and composite materials.

Disposed in the second housing 190b are a keyboard 160a and a track pad (or track ball or mouse) 160b. A display 170 (e.g., a liquid crystal display, or LCD) is disposed in the first housing 190a. Although not shown in FIG. 4, the computing device 100 may include a processing device, system memory, ROM memory, hard disk drive, a network interface, a floppy disk drive, as well as other input and output devices, such devices typically being disposed within the second housing 190b.

Antenna system 200 is disposed in the first housing 190a. In the embodiment of FIG. 4, the antenna system 200 is essentially the same as that shown and described above in FIG. 2B and includes four antennas 210, 220, 230, 240 (disposed on edge surfaces 197, 198, 199 of first housing 190a). The first, second, third, and fourth antennas 210, 220, 230, 240 are capable of performing communications over the first, second, third, and fourth modes 291, 292, 293, 294, respectively. Various embodiments of each of the first, second, third, and fourth modes 291, 292, 293, 294 are described above. In other embodiments, however, the computing device 100 may include more or fewer (e.g., see FIG. 2A) antennas and/or modes.

It is to be understood that the embodiment of computing device 100 shown in FIG. 4 is but one example of the configuration of a computing device. As previously noted, the computing device 100 may comprise any laptop computer, notebook computer, tablet style computer, hand-held computer, or other portable computing device, as well as a desktop computer or other less mobile computer platform. If the computing device 100 is a tablet style computer, the connector 195 may allow the first housing element 190a to be detached from the second housing element 190b, such that the user may carry only the first housing element 190a. With the keyboard and track pad 160a–b detached from the first housing element 190a, data entry may take place at the display 170 (e.g., through use of touch-screen technology). Also, for a tablet style computer, components such as the processing device, ROM, and system memory may be disposed within the first housing element 190a along with the display 170.

B. AMC-Based Antennas

Figure 5A:
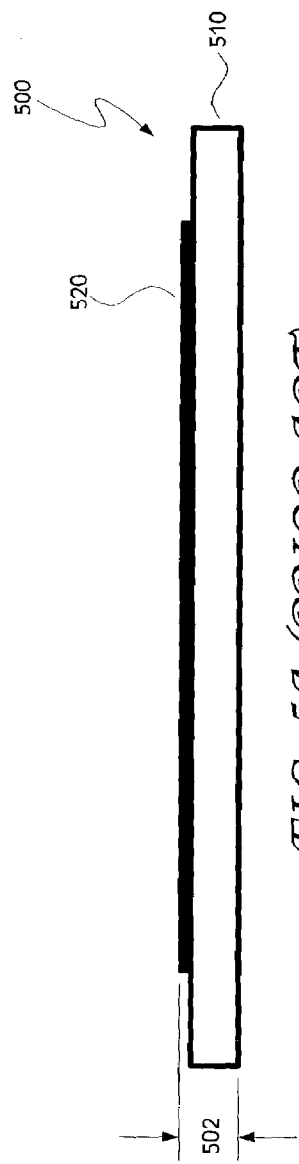
FIGS. 5A and 5B are schematic diagrams illustrating an embodiment of a conventional antenna having an artificial magnetic conductor (AMC).
Figure 5B:
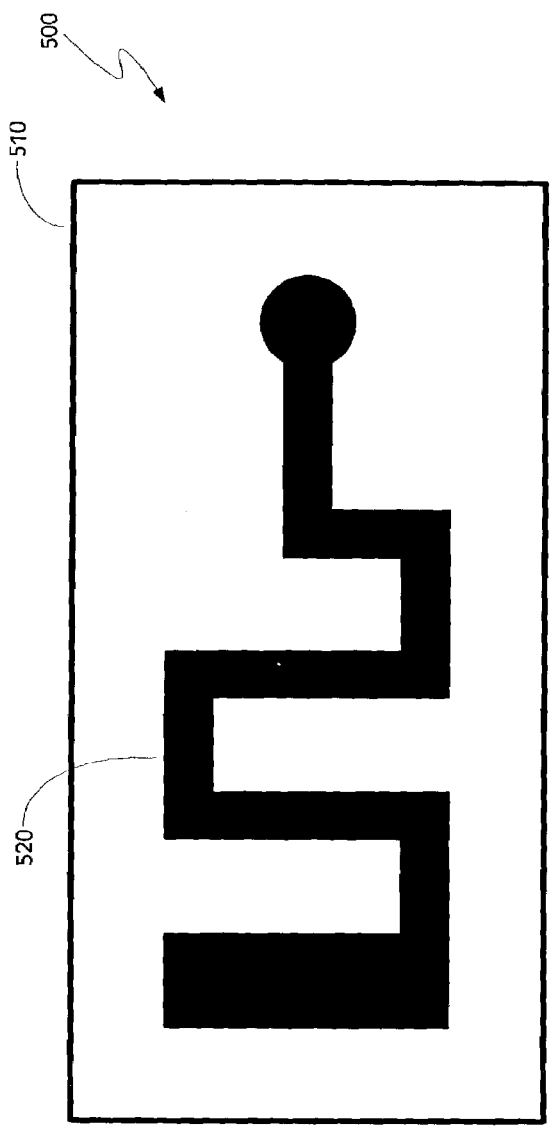

Each of the antennas 210, 220, 230, 240 may comprise any suitable type of antenna. One type of antenna that may-be employed in the multi-mode antenna system 200 is illustrated in FIGS. 5A and 5B, wherein FIG. 5A shows a side elevation view of the antenna and FIG. 5B shows a top view of the antenna. Referring to FIGS. 5A–5B, the antenna 500 includes a base 510 having an antenna element 520 disposed or formed thereon. The base 510 comprises an artificial magnetic conductor (AMC).

An AMC is an engineered electromagnetic material—typically formed using printed circuit board technology—that reflects plane waves in-phase at their resonant frequency. When an antenna element is placed in close proximity to an AMC material, the antenna element can radiate efficiently as though it were in free space. Also, use of AMC materials in an antenna system can limit mutual coupling between adjacent antennas with minimal power absorption and efficiency degradation. Thus, when AMC-based antennas are utilized in antenna system 200, the antenna system may exhibit improved isolation characteristics between antennas. Also, antennas disposed or formed on AMC substrates can be manufactured in relatively small sizes with thin profiles. For example, an AMC-based antenna 500 may have a height 502 of approximately 4 millimeters or less. Further, AMC-based antennas are generally less sensitive to contact with hands and fingers than other types of antennas, which may lead to less detuning when the computing device 100 is being held or touched by the user. Antennas utilizing these AMC materials are available from the Etenna Corporation of Laurel, Md.

C. Antenna Mounting and Isolation

Each of the antennas 210, 220, 230, 240 may be mounted on (or within) the first housing 190a (or second housing 190b) using any suitable method or technology. For example, an antenna may be directly attached to a surface of the first housing 190a, an antenna may be mounted within a cavity formed on the exterior of the first housing 190a to provide a flush mount, or an antenna may be mounted within the first housing 190a. An example of a surface mounted antenna is shown in FIG. 6A, and an example of a flush mounted antenna is illustrated in FIGS. 6A and 6B. The antennas may be secured to the housing 190a using adhesives, mechanical fasteners, or by any other suitable technique. Note that the above-described AMC materials can help to shield an antenna from noise generated by any processing device within housing 190. Also, where a metal housing 190 is used to provide shielding from any processing device located inside the housing, the use of AMC materials for surface-mounted antennas can help to isolate the antenna from the metal housing itself.

Turning now to FIG. 6A, the antenna 230 is mounted on an upper surface 197 of the first housing 190a. The antenna 230 includes an antenna element 234 formed or disposed on a base 232 (e.g., an AMC substrate). The base 232 may be directly attached to the surface 197 using adhesives, or the base 232 may be attached to the surface 197 using mechanical fasteners (e.g., screws, brackets, pins, T-slots, dovetail slots, etc.). For certain types of antennas—e.g., AMC-based antennas—the antenna 230 may extend a height 239 above the housing surface 197 of approximately 4 millimeters or less.

Referring to both FIGS. 6A and 6B, the antenna 240 is mounted in a cavity 605 formed on an exterior surface 198 of the first housing 190a. The antenna 240—which, in the embodiment of FIGS. 6A–6B, has an L-shape configuration—includes an antenna element 244 formed or disposed on a base 242. In one embodiment, the base 242 comprises an RF absorbing material to provide an improved impedance match. Base 242 may be secured within the cavity 605 using adhesives, or the base 242 may be secured within the cavity 605 using mechanical fasteners (e.g., screws, brackets, pins, T-slots, dovetail slots, etc.). Note that the cavity 605 has a depth that is at least slightly greater than a height of the antenna 240, such that the antenna 240 is mounted flush and does not extend above the exterior housing surface 198.

D. Interference and Isolation Between Antennas

The close proximity of multiple antennas on a relatively small computing device can create interference problems. Interference between antennas may be especially predominant when the frequency bands of adjacent antennas overlap, such as when placing Bluetooth and IEEE 802.11b compatible antennas near to one another (as noted above, both Bluetooth and IEEE 802.11b occupy a 2.4 GHz band). Isolation between antennas can be improved using AMC materials, as described above, and use of these AMC materials for antenna isolation is illustrated in the embodiment of FIG. 7.

Figure 7:
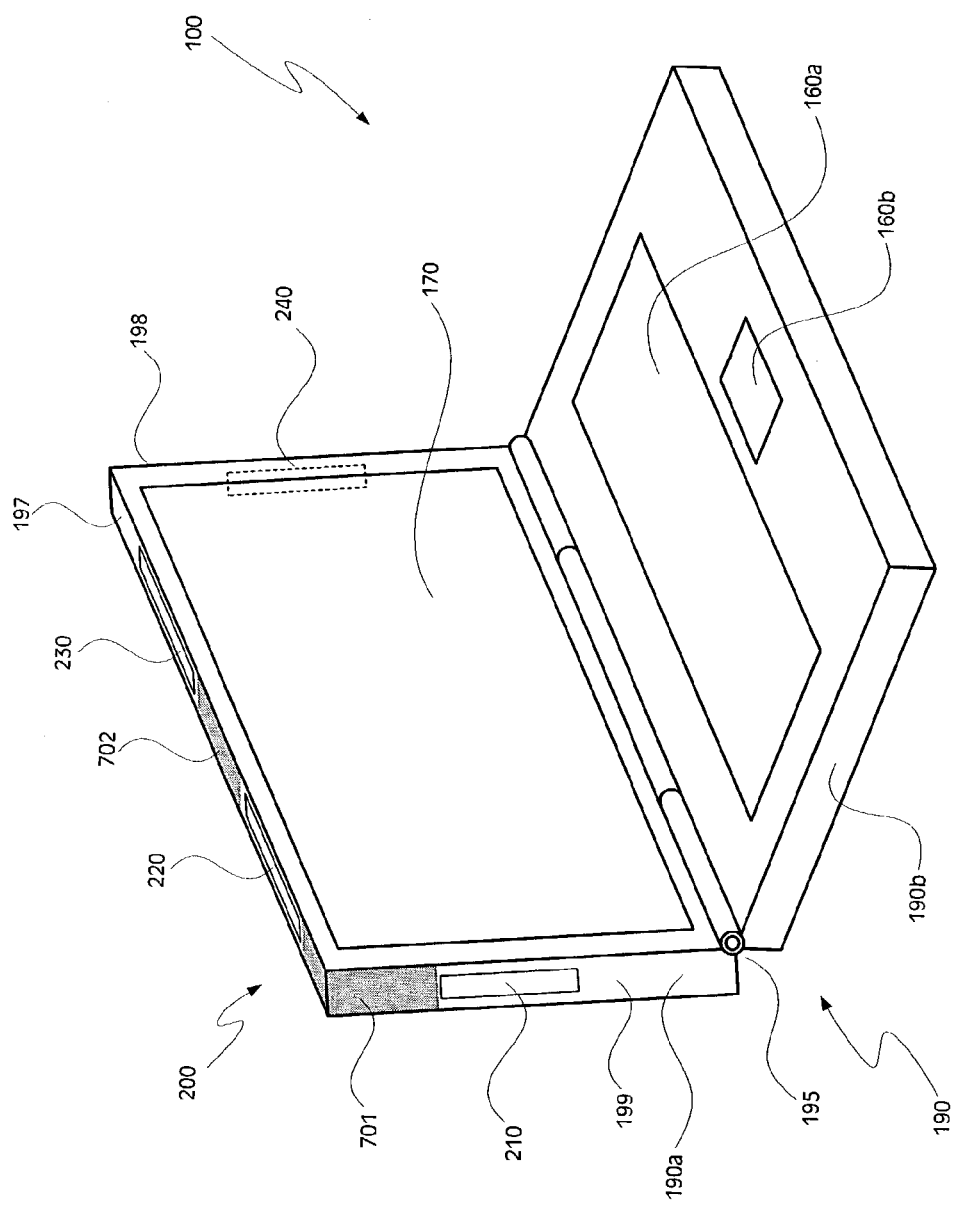
FIG. 7 is a perspective view of a further embodiment of the computing device shown in FIG. 1.

Referring now to FIG. 7, the computing device 100 includes isolation elements 701, 702. Isolation element 701 is disposed on first housing 190a between antenna 210 (e.g., for a Bluetooth communications mode) and antenna 220 (e.g., for a IEEE 802.11b communications mode), and isolation element 702 is disposed on first housing 190a between antenna 220 and antenna 230 (e.g., for a IEEE 802.11a communications mode). Of course, such isolation elements may be positioned in other suitable locations. Generally, an isolation element 701, 702 comprises any device (e.g., a coating or a separately attached part) and/or technique that provides isolation between antennas.

In one embodiment, each of the isolation elements 701, 702 comprises a layer of AMC material disposed or formed on a surface of the housing 190a. The AMC material of each isolation element 701, 702 can be tuned to attenuate signals in the appropriate band (e.g., the 2.4 GHz band). Use of AMC materials for isolation elements 701, 702 has demonstrated an improvement in attenuation from 25 dB (no isolation elements) to 45 dB. It should be understood, however, that other materials (and/or methods) may be employed for isolation between the antennas 210, 220, 230, 240, where necessary.

E. Antenna Selection and Evaluation

An embodiment of a method of selecting an antenna for the antenna system 200 is now described with respect to FIGS. 8 through 11. In particular, the method can ensure a desired coverage margin for a given antenna. It should be understood that the method described below with respect to FIGS. 8 through 11 is but one example of a method by which the antenna system 200 may be designed and, further, that any suitable guidelines and design principles may be employed to design a multi-mode antenna system 200.

Initially, the desired range and frequency are specified (e.g., up to 100 meters at a frequency in the 2.4 GHz band), and a desired coverage margin for the specified range is chosen (e.g., −4 dBi gain at 80% of azimuth angles). The wireless RF system parameters also need to be determined, including the transmitter power of the computing device 100, the receive sensitivity of the destination node, and the antenna gain of the destination node. Based upon this information, the gain of the source antenna (i.e., one of the antennas of computing device 100) can be calculated. In one embodiment, the source antenna gain is determined by the following equation (derived from the well known Friis transmission formula):

$$G_t = Rx_{sens} - P_t - G_r - (20)\log_{10}(\lambda/4\pi) + (10)(n)\log_{10}(d) \quad (1)$$

where $G_t$=gain of source antenna (dBi),
$Rx_{sens}$=receive sensitivity of destination node (dBm),
$P_t$=transmission power of source antenna (dBi),
$G_r$=gain of the destination node (dBi),
$\lambda$=wavelength (meters),
$n$=a path loss exponent determined from measurements (typically 2.5 for an office environment), and
$d$=range (meters).

Figure 8:
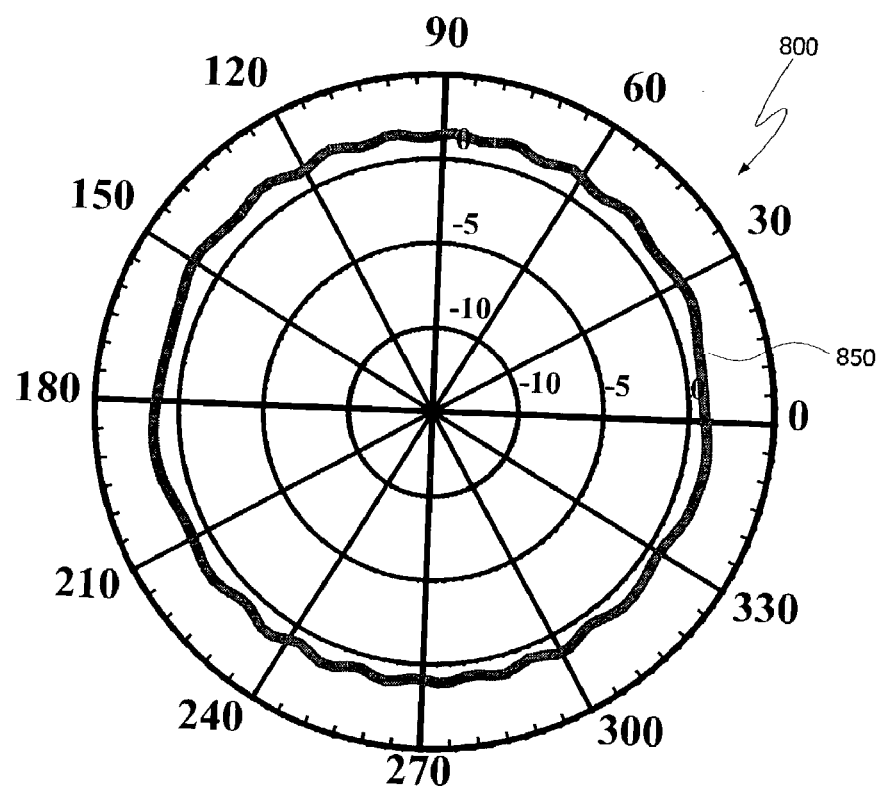
FIG. 8 is a plot of gain vs. azimuth angle for an antenna in free space.
Figure 9:
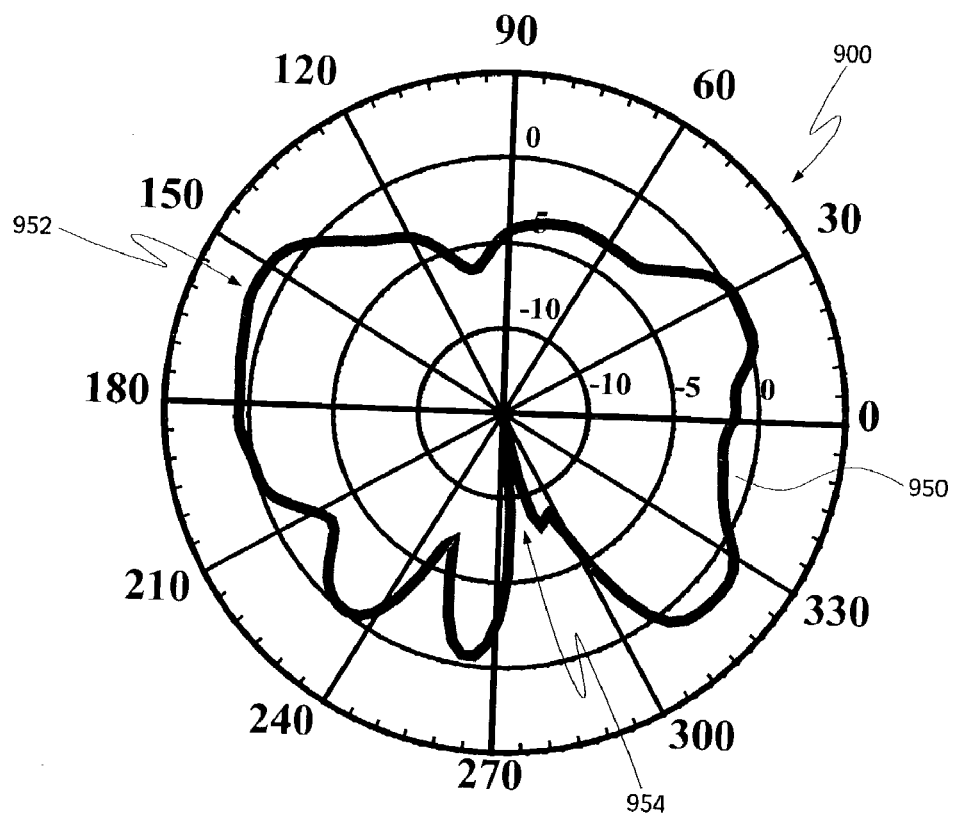
FIG. 9 is a plot of gain vs. azimuth angle of the antenna, as mounted on a computing device.
Figure 10:
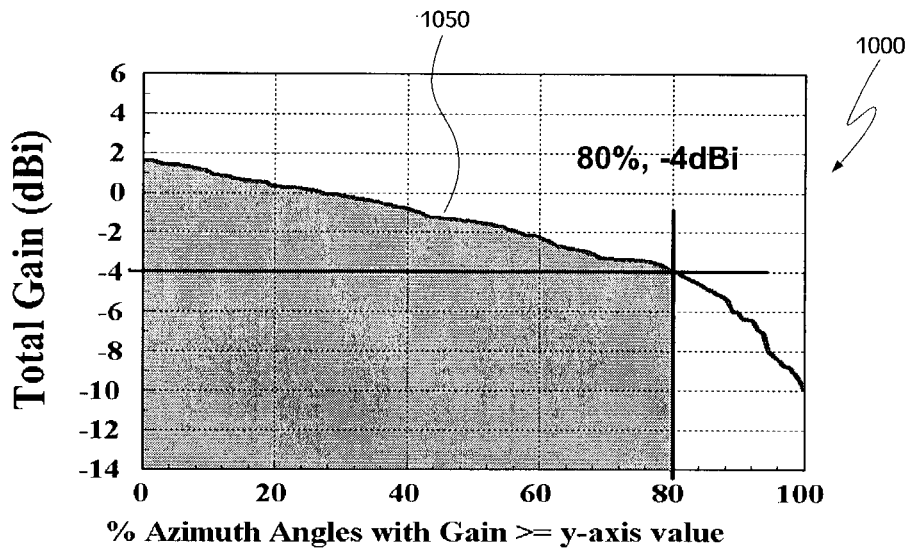
FIG. 10 is a plot of gain vs. percentage of azimuth angles with a given value of gain for the antenna, as mounted on the computing device.

Once the required gain of the source antenna ($G_t$) has been estimated from equation (1) above, an antenna can be selected and further evaluated. Evaluation of the selected antenna may include measuring the gain exhibited by the antenna as a function of azimuth angle to verify that the antenna provides the specified coverage margin. Illustrated in FIG. 8 is a plot 800 of gain vs. azimuth angle for the selected antenna in a stand-alone configuration (or in free space). The gain curve 850 shows that the gain is relatively uniform for all azimuths; however, uniform gain across all azimuths is, in practice, not obtained. When the antenna is mounted on the computing device 100, the gain pattern exhibited by the antenna will be distorted. This is illustrated in FIG. 9, which shows a plot 900 of gain vs. azimuth angle for the antenna, as mounted on computing device 100. Note that the gain curve 950 varies significantly across all azimuths between a maximum gain 952 and a minimum gain 954. Referring to FIG. 10, shown is a plot 1000 of gain vs. percentage of azimuth angles with a given value of gain (based upon the measured performance, as shown in FIG. 9). At 80% of azimuth angles, the curve 1050 of gain vs. percentage azimuth angles has a gain of approximately −4 dBi. Thus, the selected antenna has met the specified coverage margin (i.e., −4 dBi at 80% of azimuth angles).

Figure 11:
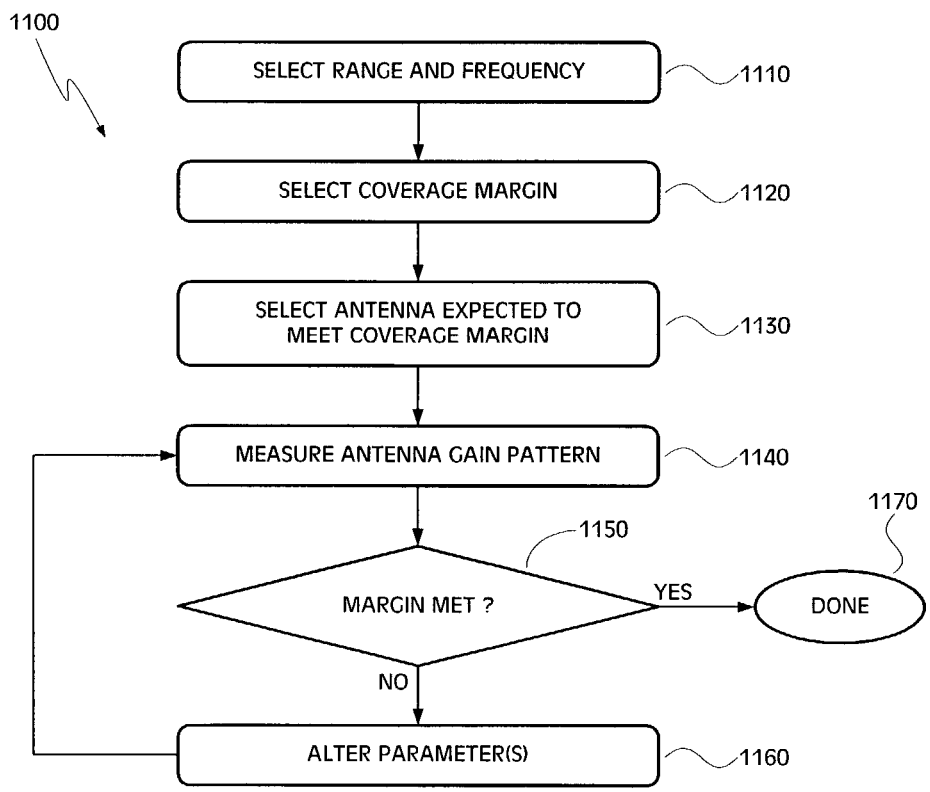
FIG. 11 is a flow chart illustrating an embodiment of a method of selecting an antenna having desired characteristics.

The above-described design methodology may be better understood with reference to FIG. 11, which illustrates a method 1100 of selecting an antenna having desired characteristics. Referring to block 1110 in FIG. 11, a range and frequency are selected (e.g., up to 10 meters in a 2.4 GHz band). A coverage margin (e.g., −4 dBi at 80% of azimuths) is also selected, as shown at block 1120. An antenna expected to meet the desired coverage margin is then selected, which is illustrated at block 1130. In one embodiment, the antenna is selected based upon an estimated gain calculated using equation (1) above.

As shown at block 1140, the antenna's gain pattern is measured across all azimuths (or a selected number of azimuths) to determine the coverage margin of the antenna. Referring to block 1150, if the coverage margin has not been met, one or more parameters can be altered—see block 1160—and the gain measurements repeated. Parameters that may be altered include transmitter power of the source computing device (e.g., computing device 100), the receive sensitivity of the destination node, and the antenna gain of the destination node. The process (i.e., steps 1140, 1150, and 1160) is repeated until the desired coverage margin is achieved, at which point an antenna having the desired characteristics has been identified and the design procedure is complete (see block 1170). It should be understood that, in some circumstances, it may not be possible to further alter any of the above-noted parameters, in which case a new antenna having improved gain characteristics may need to be selected (see block 1130), and the process repeated.

Embodiments of a computing device 100 having a multi-mode antenna system 200 having been herein described, those of ordinary skill in the art will appreciate the advantages of such an antenna system. The antenna system 200 provides for communications over any one or more of multiple modes. The multi-mode antenna system may be integrated into the housing of a computer device, thereby minimizing system volume and conserving space for other components. In addition, the multi-mode antenna may be implemented on any computer platform, including a laptop computer, a notebook computer, a tablet style computer, a hand-held computer (e.g., a PDA), or other portable computing device, as well as less mobile platforms such as desktop computers.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A computing device comprising:
   a housing having a processing device disposed within the housing;
   an antenna system including:
      a first antenna operable in a first mode of communication with a first node;
      a second antenna operable in a second mode of communication with a second node;
      an antenna shield device disposed between the first and second antennas to shield one antenna from the other to enable concurrent operation in the first mode and the second mode of communication; and
      a third antenna operable in a third mode of communication with a third node.

2. The computing device of claim 1, wherein the first mode and second modes of communication have an operating frequency in a 2.4 to 2.4835 GHz band.

3. The computing device of claim 2, wherein the third mode of communication has an operating frequency in a 450 to 1990 MHz band.

4. The computing device of claim 1, wherein the first mode comprises a wireless personal area network (PAN) connection, the second mode comprises a wireless local area network (LAN) connection, and the third mode comprises a wireless wide area network (WAN) connection.

5. The computing device of claim 1, the antenna system further comprising:
   a fourth antenna operable in a fourth mode of communication with a fourth node.

6. The computing device of claim 5, wherein the first and second modes of communication have an operating frequency in a 2.4 to 2.4835 GHz band, the third mode of communication has an operating frequency in a 450 to 1990 MHz band, and the fourth mode of communication has an operating frequency in a 5.15 to 5.825 GHz band.

7. The computing device of claim 1, the antenna shield device comprising an artificial magnetic conductor (AMC) material.

8. The computing device of claim 1, wherein at least a portion of the antenna system is disposed within the housing.

9. The computing device of claim 8, wherein the first, second, and third antennas are disposed within the housing.

10. The computing device of claim 8, wherein at least one of the first, second, or third antennas are disposed on a base within the housing, the base including an artificial magnetic conductor (AMC) material.

11. The computing device of claim 8, wherein:
    the first antenna is disposed with a first edge of the housing;
    the second antenna is disposed on a second edge of the housing, the second edge adjacent to the first edge; and
    the third antenna is disposed on a third edge of the housing, the third edge adjacent to the second edge and distal to the first edge.

12. The method of claim 11, wherein operating in the first communication mode comprises operating on a wireless connection in a 2.4 to 2.4835 GHz band, and wherein operating in the second communication mode comprises operating on a wireless connection in the 2.4 to 2.4835 GHz band.

13. The method of claim 12, wherein operating in the third communication mode comprises operating on a wireless connection in a 450 to 1990 MHz band.

14. The method of claim 11, wherein:
    operating in the first communication mode comprises operating a wireless personal area network (PAN) connection;
    operating in the second communication mode comprises operating a wireless local area network (LAN) connection; and
    operating in the third communication mode comprises operating a wireless wide area network (WAN) connection.

15. The method of claim 11, wherein:
    operating in the first communication mode with the first antenna comprises operating in the first communication mode with an antenna disposed in a first edge of a housing of the computing device;
    operating in the second communication mode with the second antenna comprises operating in the second communication mode with an antenna disposed in a second edge of a housing of the computing device, the second edge adjacent to the first edge; and
    operating in the third communication mode with the third antenna comprises operating in the third communication mode with an antenna disposed in a third edge of a housing of the computing device, the third edge adjacent to the second edge and distal to the first edge.

16. The method of claim 11, further comprising:
    operating in a fourth communication mode with a fourth antenna of a computing device on a fourth wireless connection.

17. The method of claim 16, wherein:
    operating in the first and second communication modes comprises operating on wireless connections in a 2.4 to 2.4835 GHz band;
    operating in the third communication mode comprises operating on a wireless connection in a 450 to 1990 MHz band; and
    operating in the fourth communication mode comprises operating on a wireless connection in a 5.15 to 5.825 GHz band.

18. The method of claim 11, wherein the antenna shield device comprises an artificial magnetic conductor (AMC) material.

19. A method comprising:
    operating in a first communication, mode with a first antenna of a computing device on a first wireless connection;
    operating in a second communication mode, concurrently with operating in the first communication mode, with a second antenna of the computing device on a second wireless connection, the computing device having an antenna shield disposed between the first and second antennas to enable operating in the first and the second modes; and
    operating in a third communication mode with a third antenna of the computing device on a third wireless connection.

* * * * *